United States Patent [19]

Vulih et al.

[11] Patent Number: 5,719,326
[45] Date of Patent: Feb. 17, 1998

[54] RECONFIGURABLE FILTER SYSTEM

[75] Inventors: Salomon Vulih, Neshanic St.; Harold A. Wittlinger, Pennington, both of N.J.

[73] Assignee: Harris Corporation, Melbourne, Fla.

[21] Appl. No.: 738,393

[22] Filed: Oct. 25, 1996

[51] Int. Cl.$^6$ ........................................ G01L 23/22
[52] U.S. Cl. ................... 73/35.07; 73/35.09; 364/431.08
[58] Field of Search .......................... 73/35.01, 35.07, 73/35.09, 117.3; 364/431.03, 431.08; 324/384; 333/167, 172, 173, 175, 176, 24 C; 123/425

[56] References Cited

U.S. PATENT DOCUMENTS

| | | | |
|---|---|---|---|
| 4,345,558 | 8/1982 | Yamaguchi et al. | 73/35.03 |
| 4,424,706 | 1/1984 | Oh | 73/35.09 |
| 5,121,729 | 6/1992 | Hashimoto et al. | 364/431.08 |
| 5,400,644 | 3/1995 | Remboski, Jr. et al. | 364/431.08 |

Primary Examiner—George M. Dombroske
Assistant Examiner—Eric S. McCall
Attorney, Agent, or Firm—Daniel J. Staudt; Henry Schanzer

[57] ABSTRACT

Two filter sections having different frequency responses are interconnected via selectively enabled switches, formed on the same integrated circuit (IC) as the filter sections, between a signal input terminal and a signal output terminal. The selectively enabled switches can be used to: (a) selectively connect the two filter sections in cascade between the signal input and output terminals to produce a bandpass filter; or (b) selectively connect the two filter sections in parallel to produce a notch filter, or (c) couple only one of the two filter sections between the signal input and output terminals; or (d) provide a short circuit between the signal input and output terminals. In a preferred embodiment the filter sections are switched capacitor filters. The filter system of the invention is highly suited for use in an engine knock signal processor integrated circuit.

34 Claims, 5 Drawing Sheets

RECONFIGURABLE FILTER SYSTEM

BACKGROUND OF THE INVENTION

This invention relates to means for selectively interconnecting different sections of filtering circuitry, formed on an IC, into different configurations to produce different filtering functions.

In many applications signals need to be processed by means of filters. Generally, different types of filters are used in different applications. For example, to pass high frequency signals and attenuate low frequency signals, a high pass filter will normally be used. To pass low frequency signals and attenuate high frequency signals, a low pass filter may be used. To pass signals within a band of frequencies and attenuate signals outside of the band a bandpass filter may be used. To attenuate signals within a range of frequencies and pass signals outside the range, a notch filter may be used.

In many applications, the nature of a signal to be processed by filter circuitry is not fully known and/or the signal may vary considerably in frequency and phase whereby it may be desirable to change the nature of the filtering circuitry used to process the signal. Consequently, the user of a filter system may often desire to be able to alter and/or reconfigure the filter system so as to process a signal of interest in more than one manner.

Manufacturers of integrated circuits (ICs) have developed the ability to build complex analog and digital filters on ICs to perform signal processing. Known signal processing ICs normally include filters having predetermined characteristics and functions for handling certain signals and signal conditions. As a result, manufacturers of signal processing ICs normally manufacture ICs having different filter characteristics for different applications.

However, it is desirable for an IC manufacturer to be able to produce a signal processing IC which includes filtering circuitry which can be selectively reconfigured to provide significantly different filtering functions. The obvious advantage to the manufacturer is that the same IC can be made and sold for use in many different applications. The advantage to a user of such an IC is that the filter circuitry on the IC can be selectively reconfigured to provide different filter functions which the user may need.

One type of filtering circuitry which can be manufactured on an IC is the switched capacitor filter. However the switched capacitor filter has to be clocked and to reconfigure this type of filter necessitates that care must be taken to ensure that the timing is correct. This is necessary to ensure that the signals are valid and have settled to their final (steady state) value.

Also, if filtering circuitry is to be developed which can be selectively reconfigured to provide different filtering functions, the nature and type of the building blocks need to be defined as well as the way they are to be interconnected.

SUMMARY OF THE INVENTION

A filter system embodying the invention includes first and second filter sections formed on an IC; each filter section having an input and an output. The first filter section has a first frequency response and the second filter section has a second frequency response different than that of the first section. Selectively enabled switch means couple the input and output of each one of the first and second filter sections between a signal input terminal and a signal output terminal for selectively connecting the first and second filter section either in cascade or in parallel between the signal input and the signal output terminals. The switch means may also be selectively enabled to couple only a selected one of the filter sections between the signal input and signal output terminals or to produce a short circuit between the signal input and output terminals.

In one embodiment of the invention, the first and second filter sections are switched capacitor filters, formed on the same integrated circuit (IC), with each filter having an input and an output. Selectively enabled switches interconnect the first and second switched capacitor filters and couple them between the signal input terminal and the signal output terminal. The selectively enabled switches enable the two filters to be selectively connected in cascade or in parallel between the two signal terminals. In addition, the selectively enabled switches may enable only one, or none, of the first and second filters to be selectively connected between the signal input and the signal output terminals.

In one embodiment of the invention, one of the first and second switched capacitor filters is a high pass filter and the other one of the switched capacitor filters is a low pass filter.

In another embodiment of the invention, the input of each filter is connected via a switch to the signal input terminal and the output of each filter is connected via a switch to the signal output terminal. In addition, a switch is connected between the output of the first filter and the input of the second filter and a switch is connected across the input and output of each filter to selectively short it out.

In systems embodying the invention, each switched capacitor filter may also include means for selectively altering its frequency response.

BRIEF DESCRIPTION OF THE DRAWING

In the accompanying figures, like reference characters denote like components.

FIG. 4B1 is an equivalent circuit diagram of the circuit of FIG. 4B.

FIG. 4C1 is an equivalent circuit diagram of the circuit of FIG. 4C

DETAILED DESCRIPTION OF THE INVENTION

Figure 1:
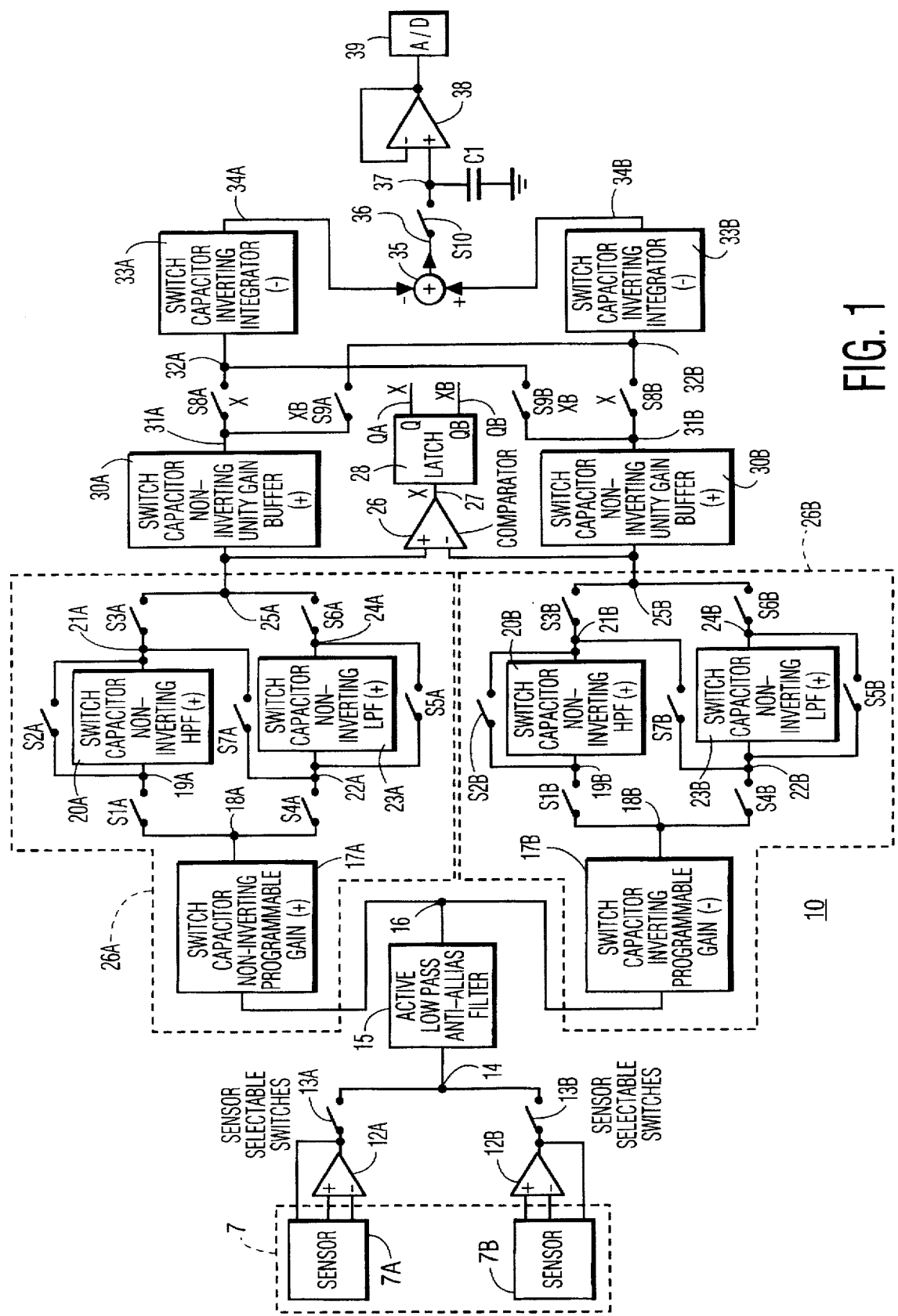
FIG. 1 is a block diagram of a system embodying the invention.

In the discussion to follow the invention will be illustrated using a filter system particularly designed to sense and process signals related to the "knocking" of an automobile engine. FIG. 1 is a block diagram of a knock sensor integrated circuit (IC) 10 in accordance with the invention. The knock sensor IC 10 functions to process the signals produced by acoustical knock sensors or accelerometers 7A and 7B normally mounted on or within an (automobile) engine.

The sensor IC 10 includes input amplifiers 12A, 12B which are coupled to "knock" sensors 7A, 7B. The output of amplifier 12A is coupled via a switch means 13A to a node 14 and the output of amplifier 12B is coupled via a switch means 13B to node 14. Switch means 13A and 13B are selectively enabled and function to select one of the two sensors and to couple the selected sensor to node 14.

The input signal at node 14 is then applied to an active low pass anti-aliasing filter 15 which produces an output signal at output terminal 16. Anti-aliasing filter 15 functions to remove high frequency components of the signal being propagated and thereby prevents aliasing in the switched capacitor filters located downstream.

The signal at terminal 16 is processed via two different paths; one path ("A") provides in-phase processing of the signal present at terminal 16 and the other path ("B") provides out-of-phase processing of the signal present at terminal 16. Thus, the signal (e16) present at terminal 16 is propagated along a non-inverting path (identified by post-scripts "A" in the drawing) which amplifies and processes the signal in-phase (non-inverting) with the signal present at terminal 16. At the same time, the signal e16 is propagated via an inverting path (identified by postscripts "B" in the drawing) which inverts the signal present at terminal 16 and proceeds to amplify and process the out-of-phase signal relative to its value at terminal 16. The in-phase and out-of-phase processing of the signal present at terminal 16 enables the system to function as a differential system to cancel common mode noise.

The signal present at terminal 16 is fed to a non-inverting switched capacitor programmable gain amplifier 17A and to an inverting switched capacitor programmable gain amplifier 17B. By way of example, non-inverting programmable amplifier 17A and inverting programmable amplifier 17 B may be of the type used in the Harris Semiconductor part HIP9011 which is an engine knock signal processor IC. Amplifier 17A produces a non-inverted amplified output at node 18A. Node 18A is coupled via a switch S1A to a node 19A to which is connected the input of a non-inverting switched capacitor high pass filter 20A having an output 21A. Node 18A is also coupled via a switch S4A to a node 22A to which is connected the input of a non-inverting switched capacitor low pass filter 23A having an output 24A. A selectively enabled switch S2A is connected between the input (19A) and the output (21A) of filter 20A. A selectively enabled switch S5A is connected between the input (22A) and the output (24A) of filter 23A. A switch S7A is connected between the output 21A of filter 20A and the input 22A of filter 23A. The output 21A of filter 20A is coupled via a switch S3A to a terminal 25A and output terminal 24A is coupled via a switch S6A to terminal 25A. Thus, elements 17A, 20A and 23A form a signal processing network 26A which processes the signal in-phase with the value of the signal present at terminal 16.

Except for the inversion produced by amplifier 17B, the signals processed and propagated along the "B" path are processed in a similar manner to that just described for the "A" path. Thus, inverter amplifier 17B produces an inverted amplified output at node 18B. Node 18B is coupled via a switch S1B to a node 19B to which is connected the input of a non-inverting switched capacitor high pass filter 20B having an output 21B. Node 18B is also coupled via a switch S4B to a node 22B to which is connected the input of a non-inverting switched capacitor low pass filter 23B having an output 24B. A selectively enabled switch S2B is connected between the input (19B) and the output (21B) of filter 20B. A selectively enabled switch S5B is connected between the input (22B) and the output (24B) of filter 23B. A switch S7B is connected between the output 21B of filter 20B and the input 22B of filter 23B. The output 21B of filter 20B is coupled via switch S3B to terminal 25B and output terminal 24B is coupled via switch S6B to terminal 25B. Thus, elements 17B, 20B and 23B form a signal processing network 26B in which element 17B inverts the signal present at terminal 16 and then supplies the inverted signal to elements 20B and/or 23B which process the signal to produce a signal at terminal 25B which is out of phase with the signal present at terminal 16.

For reasons to be discussed below, switches S1A, S2A, S3A, S4A, S5A, S6A and S7A, as well as corresponding switches S1B, S2B, S3B, S4B, S5B, S6B and S7B are selectively enabled.

The use of a high pass filter (e.g., 20A, 20B) and a low pass filter (e.g., 23A, 23B) together with the switches present in each processing network (26A, 26B) enables the system to provide many different filtering functions. By way of example, a low pass filter (LPF) may be obtained by operating the switched capacitor filter of FIG. 4A in a manner described below to yield an equivalent circuit of the type shown in FIG. 4B. A high pass filter (HPF) may be obtained by operating the switched capacitor filter of FIG. 4A in a manner described below to yield an equivalent circuit of the type shown in FIG. 4C.

It should be noted that in circuits and systems embodying the invention, two filters are used in each signal processing path. In the system of FIG. 1, filters 20A and 20B are high pass filters and filters 23A and 23B are low pass filters. A high pass filter may be connected in cascade with a low pass filter to produce a band pass filter. Such a combination is shown, for example, in FIG. 2B.

A high pass filter may be connected in parallel with a low pass filter to produce a notch filter. Such a combination is shown, for example in FIG. 2C.

Thus, in contrast to the known prior art circuitry which teaches the use of a bandpass filter between terminals corresponding to terminals 18 and 25, Applicants teach the use of a high pass filter and a low pass filter which can be combined in different ways to provide different functions.

Figure 2A:
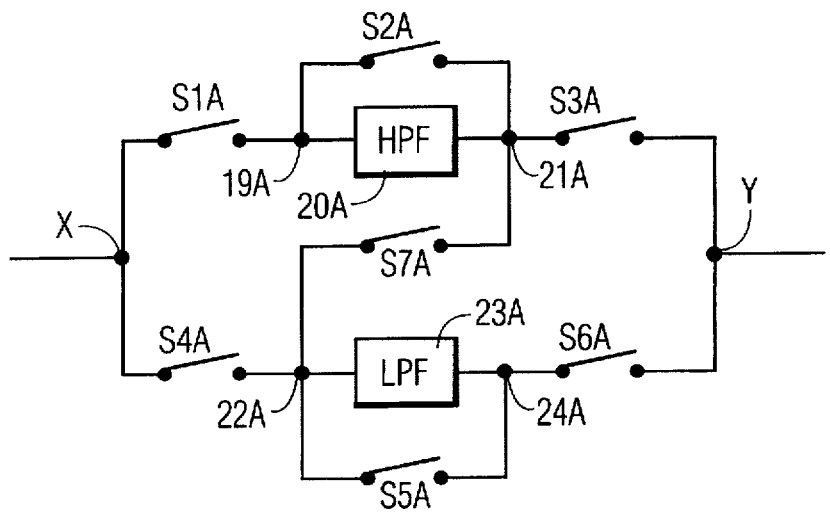
FIG. 2A is a block diagram illustrating the interconnection of two filter sections in accordance with the invention.

The selectively enabled switches may be used to reconfigure the filtering arrangement of the system. For ease of discussion, network 26A has been redrawn as FIG. 2A.

Figure 2B:
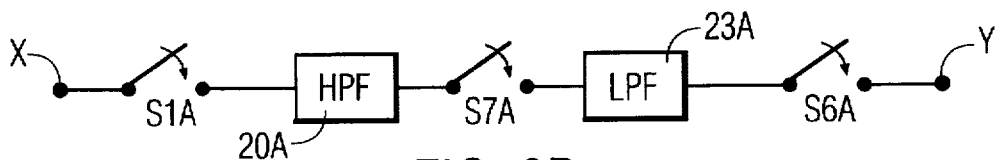
FIGS. 2B–2F are diagrams of various configurations which may be produced as a function of different switch closures.

Thus, for the condition when selectively enabled switches S1A, S7A and S6A are closed (i.e., provide conduction across the switch) and selectively enabled switches S2A, S3A, S4A, and S5A are open (i.e., provide no conduction across the switch), elements 20A and 23A are interconnected as shown in FIG. 2B. As noted above, connecting the high pass filter in cascade with the low pass filter produces a band pass filter. Note that the position of the high pass and low pass filters may be interchanged.

Figure 2C:
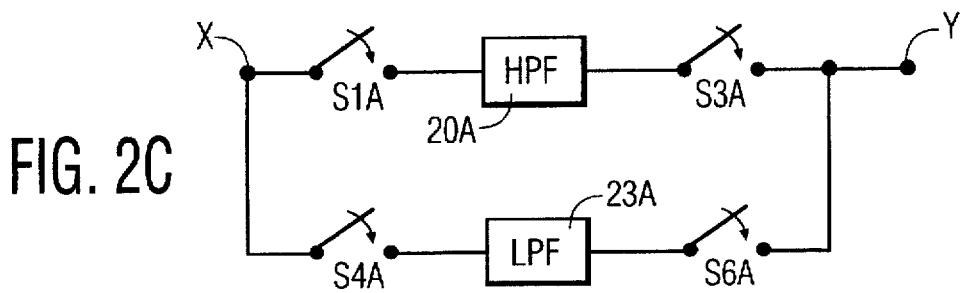

When switches S1A, S3A, S4A and S6A are closed and switches S2A, S7A and S5A are open, the filters are interconnected and configured as shown in FIG. 2C. As discussed above, this configuration produces a notch filter only passing a fixed frequency range.

Figure 2D:
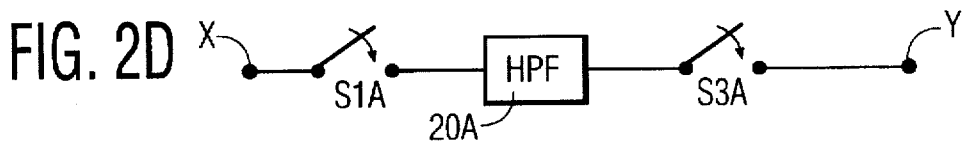

When switches S1A and S3A are closed and switches S2A, S4A, S6A and S7A are open, only the high pass filter 20A is connected in the circuit as shown in FIG. 2D.

Figure 2E:
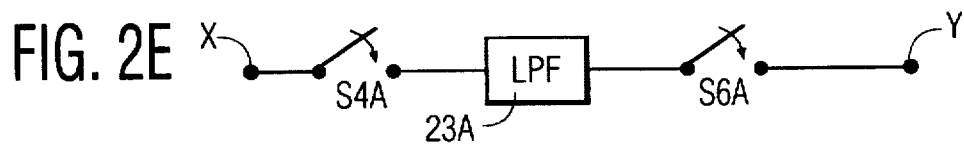

When switches S4A and S6A are closed and switches S5A, S1A and S3A are open, only the low pass filter 23A is connected in the circuit as shown in FIG. 2E.

Figure 2F:
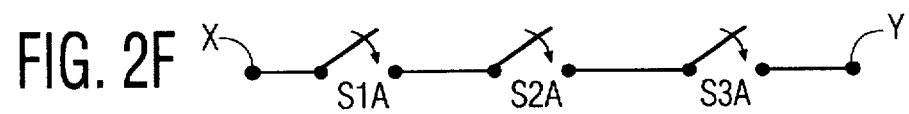

When switches S2A and S5A are closed and an appropriate combination of switches S1A, S3A, S4A, S6A and S7A are closed, there is a short circuit between terminals 18A and 25A as shown in FIG. 2F. This configuration may be of interest to test or sense the system response without any intervening filter.

Figure 3:
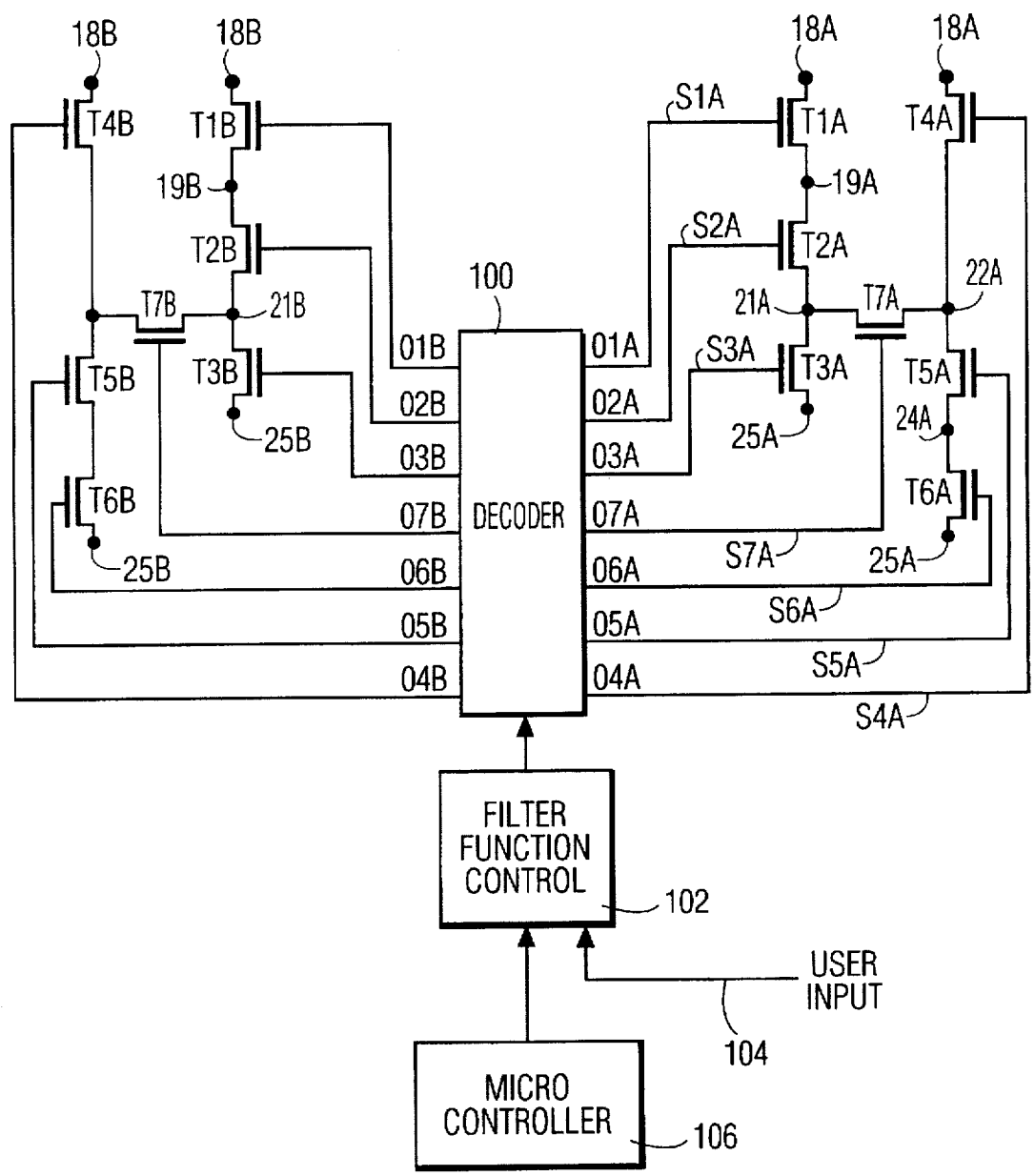
FIG. 3 is a semi-schematic semi-block diagram showing switches suitable for use in a system embodying the invention and their connections to the input and output of a switched capacitor filter in accordance with the invention.

The turn-on and turn-off of switches S1A through S7A and S1B through S7B may be accomplished as outlined in FIG. 3.

FIG. 3 illustrates that each one of the switches S1A through S7A includes a switching transistor (T1A - T7A) whose conductivity is controlled via a decoder 100 having an output (O1A - O7A) corresponding to each switching transistor and having an input supplied by a filter function control 102 settable either by a user input 104 or from a microcontroller 106.

A similar arrangement (not shown) is used to control switches S1B through S7B.

In FIG. 3, each switch is shown as a simple transistor whose conduction path is connected between the two terminals which are to be selectively interconnected via a low impedance conduction path when the signal applied to the gate of the transistor is of a polarity and amplitude to turn-on the transistor.

As is known in the art, each switching transistor (e.g., T1A - T7A, T1B - T7B) may include two transistors of complementary conductivity type having their conduction paths connected in parallel.

Figure 4A:
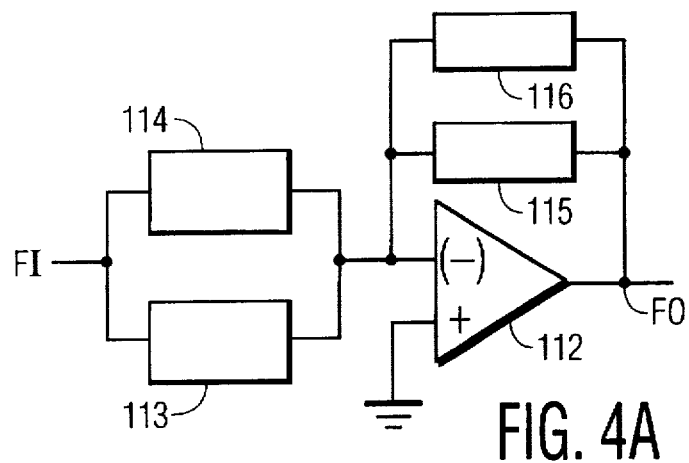
FIG. 4A is a block diagram of a switched capacitor filter suitable for use in systems embodying the invention.
Figure 4B:
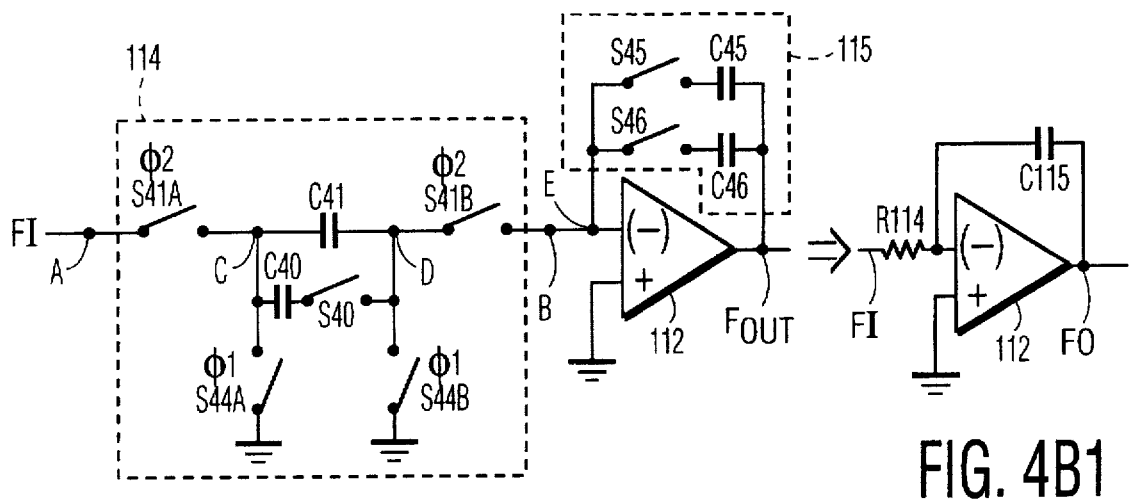
FIG. 4B is a detailed diagram of the circuit of FIG. 4A configured to function as a low pass filter.

FIG. 4A illustrates that each one of the switched capacitor filters 20A, 23A, 20B and 23B used to practice the invention may be comprised of an operational amplifier 112 having an input network comprised of two sections 113 and 114 and an output network comprised of two sections 115 and 116. The filter of FIG. 4A may be operated as a low pass filter by activating input section 114 and output section 115, as shown in FIG. 4B, and deactivating input section 113 and output section 116. Alternatively, the filter of FIG. 4A may be operated as a high pass filter by activating input section 113 and output section 116, as shown in FIG. 4C, and deactivating input section 113 and output section 115.

Figure 4C:
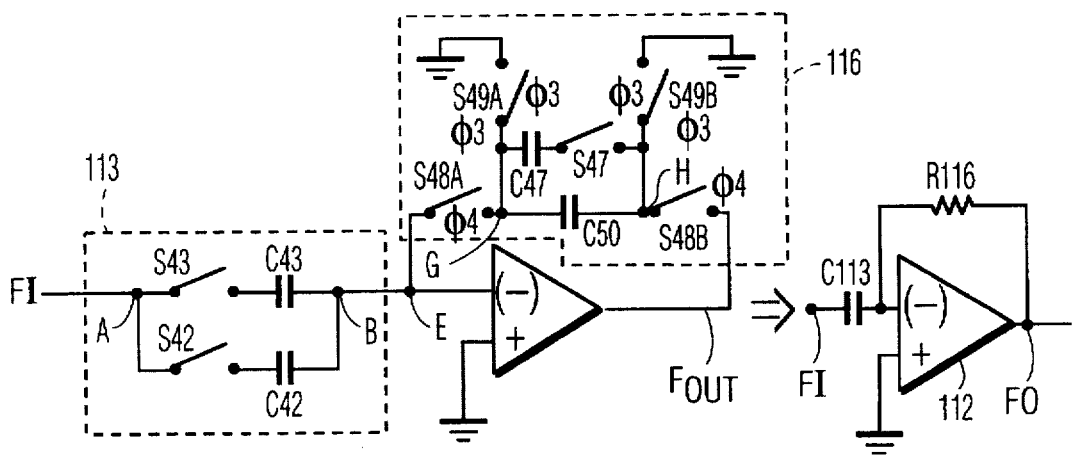
FIG. 4C is a detailed diagram of the circuit of FIG. 4A configured to function as a high pass filter.

When the filter of FIG. 4A is operated as a high pass filter, as detailed in FIG. 4C, Section 113 is rendered active by means of switch S42 connected in series with capacitor C42 between nodes A and B, and switch S43 connected in series with capacitor C43 between nodes A and B. As discussed below, the use of two (or more) capacitive paths which can be selectively connected in parallel enables the capacitance of the input network to be selectively increased or decreased. During this phase, section 114 is rendered inactive, for example, by maintaining switches S41A, S41B open and switches S44A, S44B closed.

When the filter of FIG. 4A is operated as a high pass filter, section 116 is rendered active by means of a switch S48A connected between node E and a node G, a capacitor C50 connected between node G and a node H, and a switch S48B connected between nodes H and $F_{OUT}$. Switches S48A and S48B are turned on and off by means of a clock signal ψ4. Section 116 also includes a capacitor C47 which can be selectively connected in parallel with C50 by means of switch S47. Nodes G and H can be, respectively, selectively switched to ground by means of switches S49A and S49B, which are turned on and off by means of a clock signal ψ3.

When the filter of FIG. 4A is operated as a low pass filter, as detailed in FIG. 4B, section 114 is activated by means of a switch S41A connected between node A and a node C, a capacitor C41 connected between node C and a node D, and a switch S41B connected between nodes D and B. Switches S41A and S41B are turned on and off by means of a clock signal ψ2. Section 114 also includes a capacitor C40 which can be selectively connected in parallel with C41 by means of switch S40. Nodes C and D can be, respectively, selectively switched to ground by means of switches S44A and S44B, which are turned on and off by means of a clock signal ψ1. When section 114 is activated, section 113 is deactivated by switches S42, S43 being maintained in an open position.

When the filter of FIG. 4A is operated as a low pass filter, as shown in FIG. 4B, section 115 is rendered active by means of switch S46 connected in series with capacitor C46 between nodes E and F, and switch S45 connected in series with capacitor C45 between nodes E and $F_{OUT}$. As discussed below, the use of two (or more) capacitive paths which can be selectively connected in parallel enables the capacitance of the output network to be selectively increased or decreased. When section 115 is rendered active (enabled), section 116 is deactivated (disabled) by, for example, maintaining switches S48A, S48B open and switches S49A, S49B closed.

The frequency response of the filter shown in FIG. 4A may be changed by means of microcontroller (or user) generated signals supplied to a frequency adjust circuit 108 whose outputs control the switch closures (S40 - S49B) of the filter of FIG. 4A, as detailed in FIGS. 4A and 4B. The circuit of FIG. 4A may be made to operate as a low pass filter (LPF) and to have the equivalent circuit of FIG. 4B and FIG. 4B1 by operating the circuit of FIG. 4A in the following manner. Switches S42 and S43 are opened to disconnect section 113 and switches S48A and S48B are also opened to disconnect section 116. Switch S45 is closed, connecting capacitor C45 between nodes E and $F_{OUT}$ of amplifier 112. Switch S46 may also be selectively closed to connect capacitor C46 in parallel with C45. It should be evident that additional capacitors (not shown) may be formed on the IC and selectively connected in parallel with C45. Clock signals ψ1 and ψ2 are non-overlapping clock signals which control the turn-on and turn-off of S44A, S44B, S41A and S41B. Switches S44A, S44B, S41A and S41B are switched on and off to make capacitor C41 (and any capacitance connected in parallel with it) appear as a resistor. The value of the resistance may be changed by adding (or subtracting) more capacitors in parallel with C41. For example, FIG. 4B shows that a switch S40 may be closed to connect a capacitor C40 in parallel with capacitor C41. Thus, the frequency response of the low pass filter may be changed by increasing or decreasing the capacitance of sections 114 and 115. The frequency response of the filter shown in FIG. 4A may be changed, by orders of magnitude (e.g., 20 to 1 or more) by changing the capacitor ratio.

The circuit of FIG. 4A may be made to operate as a high pass filter (HPF) having the equivalent circuit shown in FIG. 4C and 4C1 by operating the circuit of FIG. 4A in the following manner. Network 113 is activated by closing switch S42 and connecting capacitor C42 between nodes A and B. Capacitor C43 may also be connected in circuit by the closure of S43. Section 114 is deactivated by opening switches S41A and S41B and maintaining S44A and S44B closed, whereby C41 and/or C40 are effectively out of the circuit. Section 115 is deactivated by opening switches S45 and S46 whereby C45 and C46 are not connected in circuit. Network 116 is activated by applying clock signals ψ4 to switches S48A and S48B and clock signal ψ3 to switches S49A and S49B. ψ3 and ψ4 are non-overlapping clock signals causing S49A, S49B, S48A and S48B to turn on and off and causing C50 to function as a resistor, as shown in FIG. 4C1. As noted above, additional capacitance may be connected in parallel with C50. For example, switch S47 may be closed to add capacitor C47 in parallel with capacitor C50.

Figure 5:
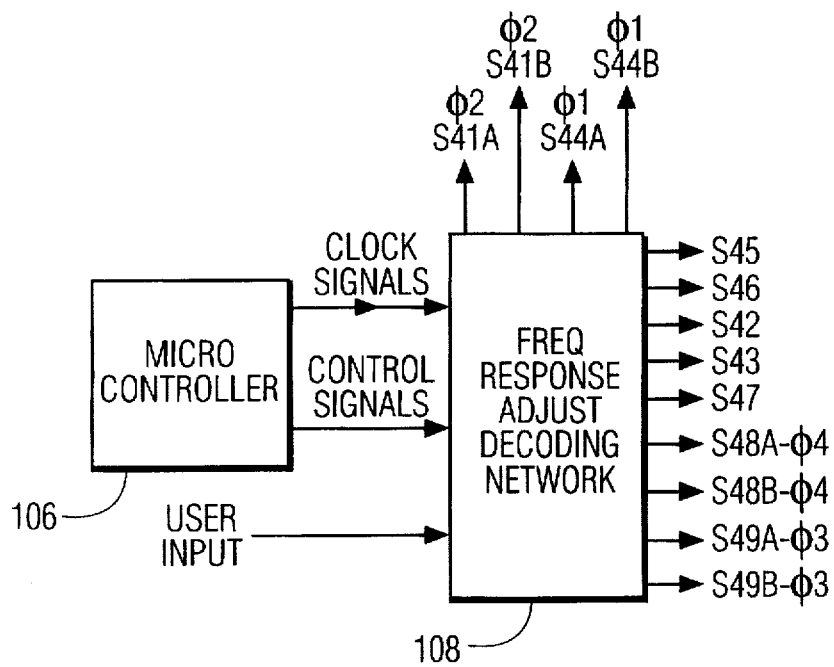
FIG. 5 is a block diagram of a decoding arrangement for controlling the configuration of the filter of FIG. 4A and for adjusting its frequency response.

As shown in FIG. 5, the switches of the circuit of FIG. 4A, detailed in FIGS. 4B and 4C, may be controlled by a frequency response adjust circuit 108 driven by microcontroller 106.

As is known in the art, each switching transistor (e.g., T1A - T7A, T1B - T7B) shown in FIG. 3 and all the switches of FIG. 4A, detailed in FIGS. 4B and 4C, may comprise a single transistor transmission gate or may include two transistors of complementary type having their conduction paths connected in parallel.

Figure 6:
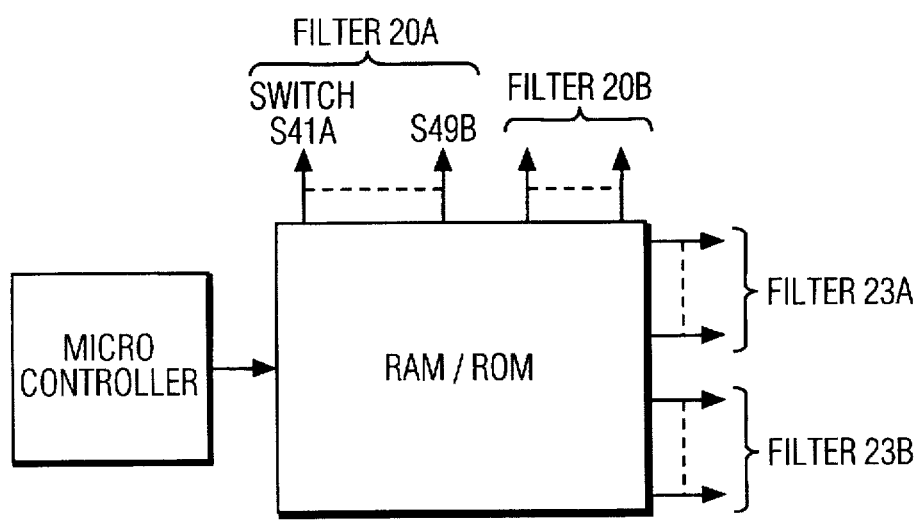
FIG. 6 is a block diagram of a RAM/ROM arrangement for controlling the configuration of the filter of FIG. 4A and for adjusting its frequency response.

In FIGS. 3, 4A, 4B and 4C the switch closures were controlled by decoder circuitry. It should be appreciated that alternatively, the switches interconnecting the inputs and outputs of the filters and the switches internal to each filter may be controlled by the combination of a ROM and/or RAM arrangement as shown in FIG. 6.

The filters 20A, 20B, 23A and 23B function to remove unwanted signal frequencies present in the signal being propagated. The output 25A is applied to an input (+) of a comparator 26 and the output 25B is applied to another input (−) of comparator 26. The output 27 of comparator 26 is applied to a latch 28 whose outputs QA and QB are used to indicate whether or not the signal at 25A is greater or less than the signal at 25B. The outputs QA and QB control the turn-on and turn-off of switches S8A, S8B, S9A and S9B, described below.

The output 25A is also applied to the input of a non-inverting switched capacitor unity gain buffer 30A having an output 31A. Similarly output 25B is also applied to the input of a non-inverting switched capacitor unity gain amplifier 30B having an output 31B.

The output 31A is coupled via a selectively enabled rectifier switch S8A to the input 32A of an inverting switched capacitor integrator 33A and via a selectively enabled rectifier switch S9A to the input 32B of an inverting switched capacitor integrator 33B. Similarly, the output 31B is coupled via a selectively enabled rectifier switch S8B to the input 32B of an inverting switched capacitor integrator 33B and via a selectively enabled switch rectifier S9B to the input 32A of inverting switched capacitor integrator 33A. The "rectified" signals produced at node 32A represent the fully rectified positive going valued input signals and the "rectified" signals produced at node 32B represent the fully rectified negative going valued input signals.

Buffers 30A and 30B serve a very significant purpose in that they isolate the output terminals 25A and 25B of filter sections 26A and 26B from being loaded down when rectifier switches 58A, 59A and 58B, 59B are turned-on (closed). Since buffers 30A and 30B isolate the output terminals 25A, 25B of the filter sections 26A, 26B, constraints on the timing for closing the rectifier switches 58A, 59A, 58B, 59B relative to the closing of the filter sections are eliminated. Thus, comparator 26, latch 28 and switches S8A, S8B, S9A and S9B function as a rectifier section to produce the absolute value of the signal. Comparator 26 may be a zero crossing detector comparator with switches S8A, S8B, S9A and S9B functioning as rectifier switches.

The output 34A of integrator 33A and the output 34B of integrator 33B are applied to the inputs of a differential to-single ended converter 35 which functions to add (sum) the in-phase and out-of-phase signals at signals 34A and 34B and produce a single ended output 36 which is coupled via a selectively enabled switch S10 to a terminal 37 of a capacitor C1 which functions to hold a voltage indicative of the energy of the knock. The capacitor C1 is coupled to the input of an amplifier 38 to provide a sample and hold circuit whose output is coupled to the input of an A/D converter 39.

What is claimed is:

1. A combination comprising:
   a signal input terminal for applying thereto a signal to be processed;
   a signal output terminal for producing thereat a processed signal
   first and second filter sections, each filter section having an input and an output; said first filter section having a first frequency response and said second filter section having a second frequency response different than said first frequency response; and
   selectively enabled switching means for selectively coupling the input of a selected filter section to said signal input terminal and the output of a selected filter section to said signal output terminal and the output of a selected one of said filter sections to the input of the other one of said filter sections.

2. A combination as claimed in claim 1,
   wherein said first and second filter sections are, respectively, first and second switched capacitor filter means, each capacitor filter means having an input and an output; and
   wherein said selectively enabled switching means includes:
   (a) a first switching means for selectively coupling said first switched capacitor filter means between said signal input and signal output terminals;
   (b) a second switching means for selectively coupling said second switched capacitor filter means between said signal input and output terminals; and
   (c) a third switching means for selectively coupling the output of said first switched capacitor filter means to the input of the second switched capacitor filter means.

3. The combination as claimed in claim 2, wherein said first switching means includes a first selectively enabled switch connected between said signal input terminal and the input of the first switched capacitor filter means and a second selectively enabled switch connected between the output of the first switched capacitor filter means and the signal output terminal; and
   wherein said second switching means includes a third selectively enabled switch connected between said signal input terminal and the input of the second switched capacitor filter means and a fourth selectively enabled switch connected between the output of the second switched capacitor filter means and the second output terminal.

4. The combination as claimed in claim 2, wherein said first, second and third switching means are controllable for selectively:
   (a) connecting said first and second switched capacitor filter means in cascade between said signal input and signal output terminals;

(b) connecting said first and second switched capacitor filter means in parallel between said signal input and signal output terminals;

(c) connecting only one of the first and second switched capacitor filter means between the signal input and output terminals; and (d) providing a short circuit between the signal input and output terminals.

5. The combination as claimed in claim 4, wherein said first switched capacitor filter means is a non-inverting high pass filter and said second switched capacitor filter means is a non-inverting low pass filter.

6. The combination as claimed in claim 3, wherein each one of said first, second, third and fourth selectively enabled switches includes a single transistor having a conduction path and a control electrode whose applied potential controls the conductivity of the conduction path.

7. The combination as claimed in claim 2, wherein the first and second switched capacitor filter means and the first, second and third switching means are all formed on the same integrated circuit (IC).

8. The combination as claimed in claim 2, including means coupled to the first and second switched capacitor filter means for programming the frequency response of a selected filter means for adjusting the response of the filter means to selected frequencies of the input signal.

9. The combination as claimed in claim 2, including means coupled to the first and second switched capacitor filter means for selectively converting a selected filter means to a bandpass filter by changing the internal wiring of the filter means.

10. A combination as claimed in claim 1 further including a knock sensor designed to sense knock signals generated by an automobile engine and means for coupling the outputs of the knock sensor to said signal input terminal.

11. The combination comprising:

a signal input terminal for applying thereto a signal to be processed;

a signal output terminal for producing thereat a processed signal;

first and second filter sections, each filter section having an input and an output; said first filter section having a first frequency response and said second filter section having a second frequency response different than said first frequency response; and selectively enabled switching means for selectively interconnecting said first and second filter sections and for selectively coupling said first and second filter sections between said signal input terminal and said signal output terminal for selectively: (a) connecting said first and second filter sections in cascade between said signal input and said signal output terminals; and (b) connecting said first and second filter sections in parallel between said signal input and said signal output terminals.

12. The combination as claimed in claim 11, wherein said first and second filter sections are, respectively, first and second switched capacitor filter means; each switched capacitor filter means having an input and an output; and wherein said selectively enabled switching means includes:

(a) a first switching means for selectively coupling said first switched capacitor filter means between said signal input and signal output terminals;

(b) a second switching means for selectively coupling said second switched capacitor filter means between said signal input and output terminals; and (c) a third switching means for selectively coupling the output of said first switched capacitor filter means to the input of the second switched capacitor filter means.

13. The combination as claimed in claim 12, wherein said first switching means includes a first selectively enabled switch connected between said signal input terminal and the input of the first switched capacitor filter means and a second selectively enabled switch connected between the output of the first switched capacitor filter means and the signal output terminal; and wherein said second switching means includes a third selectively enabled switch connected between said signal input terminal and the input of the second switched capacitor filter means and a fourth selectively enabled switch connected between the output of the second switched capacitor filter means and the second output terminal.

14. The combination as claimed in claim 12, wherein said first, second and third switching means are controllable for selectively:

(a) connecting said first and second switched capacitor filter means in cascade between said signal input and signal output terminals;

(b) connecting said first and second switched capacitor filter means in parallel between said signal input and signal output terminals;

(c) connecting only one of the first and second switched capacitor filter means between the signal input and output terminals; and (d) providing a short circuit between the signal input and output terminals.

15. The combination as claimed in claim 14, wherein said first switched capacitor filter means is a non-inverting high pass filter and said second switched capacitor filter means is a non-inverting low pass filter.

16. The combination as claimed in claim 13, wherein each one of said first, second, third and fourth selectively enabled switches includes a single transistor having a conduction and a control electrode whose applied potential controls the conductivity of the conduction path.

17. The combination as claimed in claim 12, wherein the first and second switched capacitor filter means and the first, second and third switching means are all formed on the same integrated circuit (IC).

18. The combination as claimed in claim 12, including means coupled to the switched capacitor filter means for programming the frequency response of the filter.

19. The combination as claimed in claim 12, including means coupled to the switched capacitor filters for selectively converting a selected one of these filters to a bandpass filter.

20. A combination as claimed in claim 11 further including a knock sensor designed to sense knock signals generated by an automobile engine and means for coupling the outputs of the knock sensor to said signal input terminal.

21. A combination comprising:

a signal input terminal;

first and second signal output terminals;

a first non-inverting amplifier connected between the signal input terminal and a first intermediate node;

a first signal processing circuit connected between said first intermediate node and said first signal output terminal;

a second inverting amplifier connected between the signal input terminal and a second intermediate node;

a second signal processing circuit connected between said second intermediate node and said second signal output terminal; and each one of said first and second signal processing circuits including: (a) first and second filters, each filter having an input and an output; and (b) switch means for selectively interconnecting the first and second filters of each signal processing circuit in series or in parallel.

22. A combination as claimed in claim 21 further including a knock sensor designed to sense knock signals generated by an automobile engine and means for coupling the outputs of the knock sensor to said signal input terminal.

23. A combination as claimed in claim 21 further including a comparator having a first input coupled to said first signal output terminal and having a second input coupled to said second signal output terminal, said comparator having an output at which is produced a signal indicative of whether the signal at the first signal output terminal is greater than, or less than, the signal at the second signal output terminal.

24. A combination as claimed in claim 23 further including:

buffer means for coupling the first signal output terminal to a first output node and for coupling the second output terminal to a second output node;

first and second rectified output nodes; and selectively enabled switch means coupled to and responsive to the comparator output for selectively coupling said first and second output nodes to said first and second rectified output nodes.

25. A combination as claimed in claim 24 further including a knock sensor designed to sense knock signals generated by an automobile engine and means for coupling the outputs of the knock sensor to said signal input terminal.

26. A combination as claimed in claim 23 further including:

first and second buffer amplifiers, each buffer amplifier having an input and an output;

means connecting the input of the first buffer amplifier to said first signal output terminal;

means connecting the input of the second buffer amplifier to said second signal output terminal;

a first controllable rectifier switch connected between said first buffer output and a first rectifier output node;

a second controllable rectifier switch connected between said first buffer output and a second rectifier output node;

a third controllable rectifier switch connected between said second buffer output and said first rectifier output node; and a fourth controllable rectifier switch connected between said second buffer output and said second rectifier output node.

27. A combination as claimed in claim 26, further including means coupled between said comparator output and said first, second, third and fourth controllable rectifier switches for controlling their turn-on and turn-off.

28. A combination as claimed in claim 27 further including means for combining the signals produced at said first and second rectifier output nodes.

29. A combination as claimed in claim 28 further including a knock sensor designed to sense knock signals generated by an automobile engine and means for coupling the outputs of the knock sensor to said signal input terminal.

30. A combination as claimed in claim 21 wherein each one of said first and second filters is a switched capacitor filter.

31. A combination as claimed in claim 30, wherein said first non-inverting amplifier is a switched capacitor amplifier; and wherein said second inverting amplifier is a switched capacitor amplifier.

32. A combination as claimed in claim 30, wherein each one of said first and second filters includes switchable means for controlling the characteristic of its filter and its frequency response.

33. A combination as claimed in claim 32 further including a microcontroller having signal lines coupled to said first and second signal processing paths and to each one of the said first and second filters in each processing path for selectively controlling the interconnection of the first and second filters in each path and the characteristic and frequency response of each filter.

34. A combination as claimed in claim 33, wherein the mocrocontroller and all the circuitry in the signal processing paths are formed on the same integrated circuit.

\* \* \* \* \*